(12) United States Patent
Liu et al.

(10) Patent No.: US 10,819,127 B2
(45) Date of Patent: Oct. 27, 2020

(54) CHARGING CIRCUIT, TERMINAL, AND CHARGING SYSTEM

(71) Applicant: Huawei Technologies Co., Ltd., Shenzhen (CN)

(72) Inventors: Xinyu Liu, Shenzhen (CN); Yanding Liu, Shenzhen (CN); Ce Liu, Shenzhen (CN); Pinghua Wang, Shenzhen (CN); Jinbo Ma, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/359,451

(22) Filed: Mar. 20, 2019

(65) Prior Publication Data
US 2019/0222041 A1    Jul. 18, 2019

Related U.S. Application Data

(63) Continuation of application No. PCT/CN2017/092977, filed on Jul. 14, 2017.

(30) Foreign Application Priority Data

Sep. 20, 2016  (CN) .......................... 2016 1 0836593

(51) Int. Cl.
*H02J 7/00* (2006.01)

(52) U.S. Cl.
CPC .............. *H02J 7/0031* (2013.01); *H02J 7/00* (2013.01); *H02J 7/007* (2013.01); *H02J 7/0068* (2013.01); *H02J 7/00304* (2020.01)

(58) Field of Classification Search
CPC .......... H02J 7/0031; H02J 7/00; H02J 7/0068; H02J 7/007; H02J 7/00304; H02J 7/0036; H02J 7/0029
(Continued)

(56) References Cited

U.S. PATENT DOCUMENTS 6,181,103 B1 * 1/2001 Chen .................... H01M 10/482
                                                     320/106
6,208,117 B1 * 3/2001 Hibi ...................... H02J 7/0031
                                                     320/134
(Continued)

FOREIGN PATENT DOCUMENTS

CN            101282045 B     8/2010
CN            201656501 U    11/2010
(Continued)

OTHER PUBLICATIONS

Foreign Communication From a Counterpart Application, European Application No. 17852213.2, Extended European Search Report dated Aug. 9, 2019, 19 pages.
(Continued)

*Primary Examiner* — M Baye Diao
(74) *Attorney, Agent, or Firm* — Conley Rose, P.C.

(57) ABSTRACT

A charging circuit in a terminal, or a charging system, is respectively coupled to a charger, a terminal load, and a battery. The charging circuit includes a first adjustment circuit, a current detection circuit, a voltage detection circuit, and a control circuit. A first end of the first adjustment circuit is coupled to the charger, a second end of the first adjustment circuit is further coupled to the terminal load, a third end of the first adjustment circuit is coupled to the control circuit, and a second end of the current detection circuit is coupled to a positive electrode of the battery.

20 Claims, 8 Drawing Sheets

(58) Field of Classification Search
USPC .......................................................... 320/162
See application file for complete search history.

(56) References Cited

U.S. PATENT DOCUMENTS

| | | | | |
|---|---|---|---|---|
| 6,861,824 | B1* | 3/2005 | Liu | H02J 7/0068 320/137 |
| 7,479,765 | B2* | 1/2009 | Kamatani | H02J 7/0036 320/128 |
| 8,395,359 | B2* | 3/2013 | Ashida | H02J 7/045 320/162 |
| 8,471,524 | B2* | 6/2013 | Xiao | H02J 7/0072 320/107 |
| 8,558,516 | B2* | 10/2013 | Takahashi | H02J 7/00 320/163 |
| 8,754,613 | B2* | 6/2014 | Takahashi | H02J 7/0072 320/141 |
| 9,270,136 | B2* | 2/2016 | Hsueh | H02J 7/00 |
| 9,866,229 | B2* | 1/2018 | Huang | H02M 3/00 |
| 10,038,326 | B2* | 7/2018 | Chen | H02J 7/0026 |
| 10,177,587 | B2* | 1/2019 | Zhang | H02J 7/0071 |
| 10,439,420 | B2* | 10/2019 | Zhang | H02J 7/00712 |
| 10,447,058 | B2* | 10/2019 | Zhang | H02J 7/00712 |
| 2003/0141850 | A1 | 7/2003 | Dotzler et al. | |
| 2004/0217733 | A1* | 11/2004 | Liu | H02J 7/342 320/114 |
| 2006/0139002 | A1 | 6/2006 | Zemke et al. | |
| 2010/0102778 | A1 | 4/2010 | Otsu et al. | |
| 2011/0050163 | A1* | 3/2011 | Xiao | H02J 7/0072 320/107 |
| 2013/0229144 | A1 | 9/2013 | Nagata et al. | |
| 2014/0184154 | A1 | 7/2014 | Okazaki | |
| 2014/0239886 | A1* | 8/2014 | Lalitnuntikul | H02J 7/00 320/107 |
| 2014/0253019 | A1* | 9/2014 | Wang | H02J 7/00 320/107 |
| 2015/0311735 | A1 | 10/2015 | Shimada | |
| 2016/0164322 | A1 | 6/2016 | Li et al. | |
| 2016/0164324 | A1 | 6/2016 | Hsu et al. | |
| 2016/0344218 | A1 | 11/2016 | Zhang et al. | |
| 2019/0089170 | A1* | 3/2019 | Liu | H01M 10/44 |

FOREIGN PATENT DOCUMENTS

| | | |
|---|---|---|
| CN | 202395115 U | 8/2012 |
| CN | 104158241 A | 11/2014 |
| CN | 104283283 A | 1/2015 |
| CN | 104779653 A | 7/2015 |
| CN | 104810873 A | 7/2015 |
| CN | 104885328 A | 9/2015 |
| CN | 104917271 A | 9/2015 |
| CN | 105790345 A | 7/2016 |
| CN | 105846485 A | 8/2016 |
| JP | 2000069689 A | 3/2000 |
| JP | 2004282894 A | 10/2004 |
| JP | 2006191796 A | 7/2006 |
| JP | 2008206259 A | 9/2008 |
| JP | 2014131440 A | 7/2014 |

OTHER PUBLICATIONS

Foreign Communication From a Counterpart Application, European Application No. 17852213.2, Partial Supplementary European Search Report dated May 20, 2019, 2 pages.
Foreign Communication From a Counterpart Application, European Application No. 17852213.2, European Search Report dated May 10, 2019, 4 pages.
Foreign Communication From a Counterpart Application, European Application No. 17852213.2, European Search Opinions dated May 10, 2019, 10 pages.
Machine Translation and Abstract of Chinese Publication No. CN104158241, Nov. 19, 2014, 16 pages.
Machine Translation and Abstract of Chinese Publication No. CN104283283, Jan. 14, 2015, 7 pages.
Machine Translation and Abstract of Chinese Publication No. CN104779653, Jul. 15, 2015, 8 pages.
Machine Translation and Abstract of Chinese Publication No. CN104917271, Sep. 16, 2015, 13 pages.
Machine Translation and Abstract of Chinese Publication No. CN105790345, Jul. 20, 2016, 17 pages.
Machine Translation and Abstract of Chinese Publication No. CN105846485, Aug. 10, 2016, 12 pages.
Machine Translation and Abstract of Chinese Publication No. CN201656501, Nov. 24, 2010, 12 pages.
Machine Translation and Abstract of Chinese Publication No. CN202395115, Aug. 22, 2012, 5 pages.
Machine Translation and Abstract of Japanese Publication No. JP2004282894, Oct. 7, 2004, 17 pages.
Foreign Communication From a Counterpart Application, Chinese Application No. 2016108365934, Chinese Office Action dated Mar. 21, 2018, 11 pages.
Foreign Communication From a Counterpart Application, Chinese Application No. 201610836593.4, Chinese Search Report dated Dec. 28, 2017, 6 pages.
Foreign Communication From a Counterpart Application, PCT Application No. PCT/CN2017/092977, English Translation of International Search Report dated Sep. 30, 2017, 2 pages.
Foreign Communication From a Counterpart Application, PCT Application No. PCT/CN2017/092977, English Translation of Written Opinion dated Sep. 30, 2017, 4 pages.

* cited by examiner

US 10,819,127 B2

CHARGING CIRCUIT, TERMINAL, AND CHARGING SYSTEM

CROSS-REFERENCE TO RELATED APPLICATIONS

This application is a continuation of International Patent Application No. PCT/CN2017/092977 filed on Jul. 14, 2017, which claims priority to Chinese Patent Application No. 201610836593.4 filed on Sep. 20, 2016. The disclosures of the aforementioned applications are hereby incorporated by reference in their entireties.

TECHNICAL FIELD

The present application relates to charging technologies, and in particular, to a charging circuit, a terminal, and a charging system.

BACKGROUND

With development of science and technology, functions of terminals become stronger, and users can perform office work and entertainment using the terminals. Therefore, the terminals have become an indispensable part in people's daily life. However, an endurance capability of a terminal is limited, and a user needs to continuously charge the terminal. To ensure that the user can properly use the terminal, a fast charging technology becomes a preferred solution of charging.

Currently, common fast charging technologies may mainly be classified into two types, a low-voltage high-current fast charging technology and a high-voltage low-current fast charging technology. For both low-voltage high-current fast charging and high-voltage low-current fast charging, a current in a charging circuit of a terminal may be converted, when being input into a battery, to a higher charging current (which cannot exceed a maximum safe charging current that the battery can bear or a safe charging current that does not damage a battery life). In this case, how to ensure charging safety of fast charging when high-current charging is performed on the battery becomes particularly important.

As shown in FIG. 1, an electronic device charging control apparatus is provided. In a process of charging a battery in an electronic device by the electronic device charging control apparatus, a power adapter first charges the battery by means of constant-voltage output. After receiving a fast charging instruction command sent by a charging control module, the power adapter adjusts an output voltage according to a battery voltage fed back by the charging control module, and adjusts, when the output voltage meets a fast charging voltage condition preset by the charging control module, an output current and the output voltage according to a fast charging current value and a fast charging voltage value in order to perform fast charging on the battery. In addition, the charging control module introduces a direct current from the power adapter to charge the battery. In a fast charging process, the power adapter further adjusts the output current in real time according to the output voltage of the power adapter and the battery voltage such that fast charging of the battery is implemented by adjusting the output current and the output voltage of the power adapter.

It can be learned from the foregoing that in the technical solution, the power adapter obtains, in a real-time communication manner, feedback information of a charging current and a charging voltage from the charging control module in the electronic device, and performs real-time adjustment in the power adapter. The technical solution is applicable to a scenario in which a requirement on real-time adjustment is relatively low in a charging process. In a charging scenario in which a requirement on real-time adjustment is relatively high, if a current required by a terminal load suddenly decreases and output adjustment of the power adapter is not performed in time, the charging current flowing to the battery suddenly increases. This easily causes a potential safety threat to a charging circuit and a charged battery in the electronic device.

SUMMARY

Embodiments of the present application provide a charging circuit, a terminal, and a charging system such that in a scenario in which a charging current suddenly increases during charging because a current consumed by a terminal load decreases and an output current from a power adapter cannot be adjusted in time, the charging current can be adjusted and controlled in order to prevent damage to a battery or the charging circuit due to an excessively high charging current, thereby ensuring charging safety.

A first aspect of the present application provides a charging circuit. The charging circuit is respectively connected to a charger, a terminal load, and a battery such that when charging the battery using the charging circuit, the charger can further supply power to the terminal load.

Further, the charging circuit includes a first adjustment circuit, a current detection circuit, a voltage detection circuit, and a control circuit.

A first end of the first adjustment circuit is connected to the charger, a second end of the first adjustment circuit is connected to a positive electrode of the battery, the second end of the first adjustment circuit is further connected to the terminal load, and a third end of the first adjustment circuit is connected to the control circuit.

A negative electrode of the battery is connected to the charger.

The current detection circuit is connected in series between the second end of the first adjustment circuit and the positive electrode of the battery, or is connected in series between the negative electrode of the battery and the charger.

A detection end of the voltage detection circuit is connected in parallel at the positive and negative electrodes of the battery, and an output end of the voltage detection circuit is further connected to the control circuit.

The voltage detection circuit is configured to detect voltages at two ends of the battery to obtain a voltage value of the battery, and send the voltage value of the battery to the control circuit.

The current detection circuit is configured to detect a current of the charging circuit to obtain a current value of the charging circuit, and send the current value to the first adjustment circuit.

The control circuit is configured to determine a charging mode according to the voltage value of the battery, and determine a current upper limit value according to the charging mode.

The first adjustment circuit is configured to obtain the current value and the current upper limit value, and is further configured to compare the current value with the current upper limit value to determine whether the current value is greater than the current upper limit value, and when the current value is greater than the current upper limit value, adjust upward an impedance of the first adjustment circuit according to the current value.

It should be noted that an objective of adjusting upward the impedance of the first adjustment circuit is to decrease a charging current, that is, a larger current value indicates a higher adjusted impedance of the first adjustment circuit.

Further, it should be noted that the current detection circuit is further connected to the control circuit.

The current detection circuit is further configured to send the current value to the control circuit.

The control circuit is configured to determine whether the current value is greater than the current upper limit value, and when the current value is greater than the current upper limit value, send an adjustment instruction to the charger such that the charger adjusts downward output power, an output current, or an output voltage.

With reference to the first aspect, it should be noted that the control circuit is further configured to determine a current lower limit value according to the charging mode. The first adjustment circuit is further configured to obtain the current lower limit value, compare the current value with the current lower limit value to determine whether the current value is less than the current lower limit value, and when the current value is less than the current lower limit value, adjust downward the impedance of the first adjustment circuit according to the current value.

It should be noted that if the impedance of the first adjustment circuit is currently relatively high, the output current of the charger decreases after the control circuit interacts with the charger. In this case, the charging current of the charging circuit decreases and charging efficiency is affected. To ensure the charging efficiency of the battery, the impedance of the first adjustment circuit needs to be adjusted downward to increase the charging current.

With reference to the first aspect, to prevent an overvoltage or an overcurrent, the charging circuit further includes a protection circuit. The protection circuit is connected in series between the charger and the first end of the first adjustment circuit. The control circuit is further connected to the protection circuit. The control circuit is further configured to determine a protection trigger condition according to the charging mode, and send the protection trigger condition to the protection circuit. The protection circuit is configured to detect the output current of the charger to determine an output current value, determine whether the output current value meets the protection trigger condition, and when the output current value meets the protection trigger condition, open a switch to interrupt charging.

It should be noted that the protection trigger condition includes a current protection trigger condition and a voltage protection trigger condition. That is, the protection circuit is further configured to detect the output current of the charger to determine the output current value, determine whether the output current value is greater than the current protection trigger condition, and when the output current value is greater than the current protection trigger condition, open the switch to interrupt charging.

It may be understood that the protection circuit may detect whether a voltage of the battery is an overvoltage and detect whether the output voltage of the charger is an overvoltage. Therefore, the voltage protection trigger condition includes a battery voltage protection trigger condition and a charger voltage protection trigger condition. Further, the voltage of the battery corresponds to the battery voltage protection trigger condition, and the output voltage of the charger corresponds to the charger voltage protection trigger condition.

The protection circuit is further connected to the voltage detection circuit to obtain the voltage value of the battery. The protection circuit is further configured to determine whether the voltage value of the battery is greater than the battery voltage protection trigger condition, and when the voltage value of the battery is greater than the battery voltage protection trigger condition, open the switch to interrupt charging.

The protection circuit is further configured to detect the output voltage of the charger to obtain an output voltage value, determine whether the output voltage value is greater than the charger voltage protection trigger condition, and when the output voltage value is greater than the charger voltage protection trigger condition, open the switch to interrupt charging.

With reference to the first aspect, the charging circuit further includes a communication circuit. The communication circuit is connected to the control circuit.

The control circuit is further configured to send the charging mode to the communication circuit.

The communication circuit is configured to send the charging mode to the charger such that the charger performs charging according to the charging mode.

It should be noted that the communication circuit may be connected to the charger using a connection cable or may interact with the charger in a wireless manner to perform information transfer.

With reference to the first aspect, to adjust the charging current more precisely, the charging circuit further includes a second adjustment circuit.

The second adjustment circuit is connected in series between the second end of the first adjustment circuit and the positive electrode of the battery. It should be noted that if the current detection circuit is connected in series between the first adjustment circuit and the positive electrode of the battery, alternatively, the second adjustment circuit may be connected in series between the positive electrode of the battery and the current detection circuit, or may be connected in series between the second end of the first adjustment circuit and the current detection circuit.

The second adjustment circuit is further connected to the control circuit.

The control circuit is further configured to determine an adjustment threshold of the second adjustment circuit according to the charging mode.

The second adjustment circuit is configured to adjust an impedance of the second adjustment circuit according to the current value and the adjustment threshold of the second adjustment circuit.

Further, it should be noted that the adjustment threshold of the second adjustment circuit also includes an upper threshold and a lower threshold. It may be understood that when the current value is greater than the upper threshold, the impedance of the second adjustment circuit is adjusted upward to decrease the charging current, or when the current value is less than the lower threshold, the impedance of the second adjustment circuit is adjusted downward to increase the charging current.

With reference to the first aspect, it should be noted that to prevent a current required by the terminal load from suddenly decreasing, the charging circuit further includes a third adjustment circuit and a current monitoring circuit.

The third adjustment circuit and the current monitoring circuit are connected in series between the second end of the first adjustment circuit and the terminal load.

The current monitoring circuit is configured to monitor a decrease amplitude of a current of the terminal load, and when the decrease amplitude exceeds a preset threshold, send an adjustment instruction to the third adjustment circuit.

The third adjustment circuit is configured to adjust upward an impedance of the third adjustment circuit according to the adjustment instruction.

Further, it should be noted that the third adjustment circuit is further configured to restore, after preset duration, the impedance of the third adjustment circuit to a state before the impedance is adjusted upward. Alternatively, the third adjustment circuit is further configured to adjust downward the impedance of the third adjustment circuit after preset duration.

It should be noted that the preset duration is greater than current adjustment duration of the charger. After the current required by the terminal load decreases, the current of the charging circuit increases. Therefore, in this case, the control circuit sends, to the charger, an instruction for decreasing the output current. After receiving the instruction, the charger has the current adjustment duration, that is, the charger adjusts the current to a target value in the current adjustment duration.

A second aspect of the present application discloses another charging circuit. The charging circuit is respectively connected to a charger, a terminal load, and a battery, and the charging circuit includes a first adjustment circuit, a current detection circuit, a voltage detection circuit, and a control circuit.

Different from the charging circuit disclosed in the first aspect, the adjustment circuit in the charging circuit is deployed in a branch circuit.

Further, a first end of the first adjustment circuit is connected to the charger, the first end of the first adjustment circuit is further connected to the terminal load, a second end of the first adjustment circuit is connected to a positive electrode of the battery, and a third end of the first adjustment circuit is connected to the control circuit.

A negative electrode of the battery is connected to the charger.

The current detection circuit is connected in series between the second end of the first adjustment circuit and the positive electrode of the battery, or is connected in series between the negative electrode of the battery and the charger.

A detection end of the voltage detection circuit is connected in parallel at the positive and negative electrodes of the battery, and an output end of the voltage detection circuit is connected to the control circuit.

The voltage detection circuit is configured to detect voltages at two ends of the battery to obtain a voltage value of the battery, and send the voltage value of the battery to the control circuit.

The current detection circuit is configured to detect a current of the charging circuit to obtain a current value of the charging circuit, and send the current value to the first adjustment circuit.

The control circuit is configured to determine a charging mode according to the voltage value of the battery, and determine a current upper limit value according to the charging mode.

The first adjustment circuit is configured to obtain the current value and the current upper limit value, and is further configured to compare the current value with the current upper limit value to determine whether the current value is greater than the current upper limit value, and when the current value is greater than the current upper limit value, adjust upward an impedance of the first adjustment circuit according to the current value.

Further, it should be noted that the current detection circuit is further connected to the control circuit.

The current detection circuit is further configured to send the current value to the control circuit.

The control circuit is configured to determine whether the current value is greater than the current upper limit value, and when the current value is greater than the current upper limit value, send an adjustment instruction to the charger such that the charger adjusts downward output power, an output current, or an output voltage.

With reference to the second aspect, it should be noted that after the control circuit interacts with the charger, the charger adjusts downward the output current. In this case, a charging current decreases. To ensure charging efficiency, the impedance of the first adjustment circuit needs to be adjusted downward. Details are as follows.

The control circuit is further configured to determine a current lower limit value according to the charging mode.

The first adjustment circuit is configured to obtain the current lower limit value, compare the current value with the current lower limit value to determine whether the current value is less than the current lower limit value, and when the current value is less than the current lower limit value, adjust downward the impedance of the adjustment circuit according to the current value.

With reference to the second aspect, to prevent an overvoltage or an overcurrent, the charging circuit further includes a protection circuit.

The protection circuit is connected in series between the charger and the first end of the first adjustment circuit.

The control circuit is further connected to the protection circuit.

The control circuit is further configured to determine a protection trigger condition according to the charging mode, and send the protection trigger condition to the protection circuit.

The protection circuit is configured to detect the output current of the charger to determine an output current value, determine whether the output current value meets the protection trigger condition, and when the output current value meets the protection trigger condition, open a switch to interrupt charging.

It may be understood that the protection trigger condition includes both a current trigger protection condition and a voltage trigger protection condition.

Further, the protection circuit is configured to determine whether the output current value is greater than the current protection trigger condition, and when the output current value is greater than the current protection trigger condition, open the switch to interrupt charging.

It may be understood that the protection circuit may detect whether a voltage of the battery is an overvoltage and detect whether an output voltage of the charger is an overvoltage. Therefore, the voltage protection trigger condition includes a battery voltage protection trigger condition and a charger voltage trigger protection condition. Further, the voltage of the battery corresponds to the battery voltage protection trigger condition, and the output voltage of the charger corresponds to the charger voltage protection trigger condition.

The protection circuit is further connected to the voltage detection circuit to obtain the voltage value of the battery. The protection circuit is further configured to determine whether the voltage value of the battery is greater than the battery voltage protection trigger condition, and when the voltage value of the battery is greater than the battery voltage protection trigger condition, open the switch to interrupt charging.

The protection circuit is further configured to detect the output voltage of the charger to obtain an output voltage value, determine whether the output voltage value is greater than the charger voltage protection trigger condition, and when the output voltage value is greater than the charger voltage protection trigger condition, open the switch to interrupt charging.

With reference to the second aspect, it should be noted that the control circuit needs to interact with the charger to control the charger to adjust the output power, the output voltage, or the output current. Therefore, the charging circuit further includes a communication circuit. The communication circuit is connected to the control circuit.

The control circuit is further configured to send the charging mode to the communication circuit.

The communication circuit is configured to send the charging mode to the charger such that the charger performs charging according to the charging mode.

It should be noted that the communication circuit may be connected to the charger using a connection cable to perform information transfer. Alternatively, the communication circuit may interact with the charger in a wireless manner.

With reference to the second aspect, optionally, the charging circuit further includes a second adjustment circuit and a current monitoring circuit.

The second adjustment circuit and the current monitoring circuit are connected in series between the first end of the first adjustment circuit and the terminal load.

The current monitoring circuit is configured to monitor a decrease amplitude of a current of the terminal load, and when the decrease amplitude exceeds a preset threshold, send an adjustment instruction to the second adjustment circuit.

The second adjustment circuit is configured to adjust upward an impedance of the second adjustment circuit according to the adjustment instruction.

Further, it should be noted that the second adjustment circuit is further configured to restore, after preset duration, the impedance of the second adjustment circuit to a state before the impedance is adjusted upward.

A third aspect of the present application discloses another charging circuit. The charging circuit is respectively connected to a charger, a terminal load, and a battery, and the charging circuit includes an adjustment circuit and a current monitoring circuit.

A first end of the adjustment circuit is connected to the charger, a second end of the adjustment circuit is connected to a first end of the current monitoring circuit, and a second end of the current monitoring circuit is connected to the terminal load.

A positive electrode of the charger is connected to a positive electrode of the battery, and a negative electrode of the charger is connected to a negative electrode of the battery.

The current monitoring circuit is configured to monitor a decrease amplitude of a current of the terminal load, and when the decrease amplitude exceeds a preset threshold, send an adjustment instruction to the adjustment circuit.

The adjustment circuit is configured to adjust upward an impedance of the adjustment circuit according to the adjustment instruction.

Further, it should be noted that the adjustment circuit is further configured to after preset duration for which the impedance of the adjustment circuit is adjusted upward, restore the impedance of the adjustment circuit to a state before the impedance is adjusted upward.

With reference to the third aspect, it should be noted that to prevent an overvoltage or an overcurrent, the charging circuit further includes a current detection circuit, a voltage detection circuit, a control circuit, and a protection circuit.

The protection circuit is connected in series between the charger and the positive electrode of the battery.

The current detection circuit is connected in series between the protection circuit and the positive electrode of the battery, or is connected in series between the negative electrode of the battery and the charger.

A detection end of the voltage detection circuit is connected in parallel at the positive and negative electrodes of the battery.

The control circuit is connected to the current detection circuit, is further connected to an output end of the voltage detection circuit, and is further connected to the protection circuit.

The voltage detection circuit is configured to detect voltages at two ends of the battery to obtain a voltage value of the battery, and send the voltage value of the battery to the control circuit.

The current detection circuit is configured to detect a current of the charging circuit to obtain a current value of the charging circuit, and send the current value to the protection circuit.

The control circuit is configured to determine a charging mode according to the voltage value of the battery, and determine a protection trigger condition according to the charging mode.

The protection circuit is configured to detect an output current of the charger to determine an output current value, determine whether the output current value meets the protection trigger condition, and when the output current value meets the protection trigger condition, open a switch to interrupt charging.

It may be understood that the protection circuit may detect whether a voltage of the battery is an overvoltage and detect whether an output voltage of the charger is an overvoltage. Therefore, the voltage protection trigger condition includes a battery voltage protection trigger condition and a charger voltage trigger protection condition. Further, the voltage of the battery corresponds to the battery voltage protection trigger condition, and the output voltage of the charger corresponds to the charger voltage protection trigger condition.

The protection circuit is further connected to the voltage detection circuit to obtain the voltage value of the battery. The protection circuit is further configured to determine whether the voltage value of the battery is greater than the battery voltage protection trigger condition, and when the voltage value of the battery is greater than the battery voltage protection trigger condition, open the switch to interrupt charging.

The protection circuit is further configured to detect an output voltage of the charger to obtain an output voltage value, determine whether the output voltage value is greater than the charger voltage protection trigger condition, and when the output voltage value is greater than the charger voltage protection trigger condition, open the switch to interrupt charging.

A fourth aspect of the present application further discloses a terminal. The terminal includes the charging circuit according to any one of the first aspect to the third aspect.

A fifth aspect of the present application discloses a charging system. The charging system includes a charger, a connection cable, and the terminal according to the fourth aspect.

The charger is connected to the terminal using the connection cable.

A sixth aspect of the present application discloses a charging method. The method includes detecting a charging current to obtain a charging current value, detecting a voltage of a battery to obtain a voltage value of the battery, determining a charging mode matching the voltage value of the battery, determining a current upper limit value according to the charging mode, and when the charging current value is greater than the current upper limit value, adjusting upward an impedance of a charging path according to the charging current value.

Further, it should be noted that the method further includes determining a current lower limit value according to the charging mode, and when the charging current value is less than the current lower limit value, adjusting downward the impedance of the charging path according to the charging current value.

It can be learned from the foregoing that technical solutions of the present application provide a charging circuit, a terminal, and a charging system. The charging circuit is respectively connected to the charger, the terminal load, and the battery. The charging circuit includes the first adjustment circuit, the current detection circuit, the voltage detection circuit, and the control circuit. The first end of the first adjustment circuit is connected to the charger, the second end of the first adjustment circuit is connected to the positive electrode of the battery, the second end of the first adjustment circuit is further connected to the terminal load, and the third end of the first adjustment circuit is connected to the control circuit. The negative electrode of the battery is connected to the charger. The current detection circuit is connected in series between the second end of the first adjustment circuit and the positive electrode of the battery, or is connected in series between the negative electrode of the battery and the charger. The detection end of the voltage detection circuit is connected in parallel at the positive and negative electrodes of the battery. The output end of the voltage detection circuit is connected to the control circuit. The voltage detection circuit is configured to detect voltages at two ends of the battery to obtain a voltage value of the battery, and send the voltage value of the battery to the control circuit. The current detection circuit is configured to detect a current of the charging circuit to obtain a current value of the charging circuit, and send the current value to the first adjustment circuit. The control circuit is configured to determine a charging mode according to the voltage value of the battery, and determine a current upper limit value according to the charging mode. The first adjustment circuit is configured to obtain the current value and the current upper limit value, and is further configured to compare the current value with the current upper limit value to determine whether the current value is greater than the current upper limit value, and when the current value is greater than the current upper limit value, adjust upward an impedance of the first adjustment circuit according to the current value. The charging circuit provided in the present application can adjust, when a charging current suddenly increases, the charging current in order to prevent damage to the charging circuit and the battery due to an excessively high charging current. Further, after the charger adjusts downward an output current, the charging current decreases. In this case, the impedance of the adjustment circuit in the charging circuit may be adjusted downward to increase the charging current in order to ensure charging efficiency.

BRIEF DESCRIPTION OF DRAWINGS

To describe the technical solutions in some of the embodiments of the present application more clearly, the following briefly describes the accompanying drawings describing the embodiments of the present application. The accompanying drawings in the following description show merely some embodiments of the present application, and a person of ordinary skill in the art may still derive other drawings from these accompanying drawings without creative efforts.

DESCRIPTION OF EMBODIMENTS

To make the purpose, technical solutions, and advantages of the embodiments of the present application clearer, the following describes the technical solutions of the embodiments of the present application with reference to the accompanying drawings in the embodiments of the present application.

With development of science and technology, functions of terminals (for example, electronic devices such as a smartphone, a wearable device, and a tablet computer) are becoming stronger, and users can perform office work and entertainment using the terminals such that the terminals have become an indispensable part in people's daily life. However, an endurance capability of a terminal is limited, and a user needs to continuously charge the terminal.

To ensure that the user can properly use the terminal, a fast technology becomes a preferred solution of charging.

Currently, common fast charging technologies may mainly be classified into two types, a low-voltage high-current fast charging technology and a high-voltage low-current fast charging technology. For both low-voltage high-current fast charging and high-voltage low-current fast charging, a current in a charging circuit of a terminal may be converted, when being input into a battery, to a higher charging current (which cannot exceed a maximum safe charging current that the battery can bear or a safe charging current that does not damage a battery life). In this case, how to ensure charging safety of fast charging when high-current charging is performed on the battery becomes particularly important.

Figure 1:
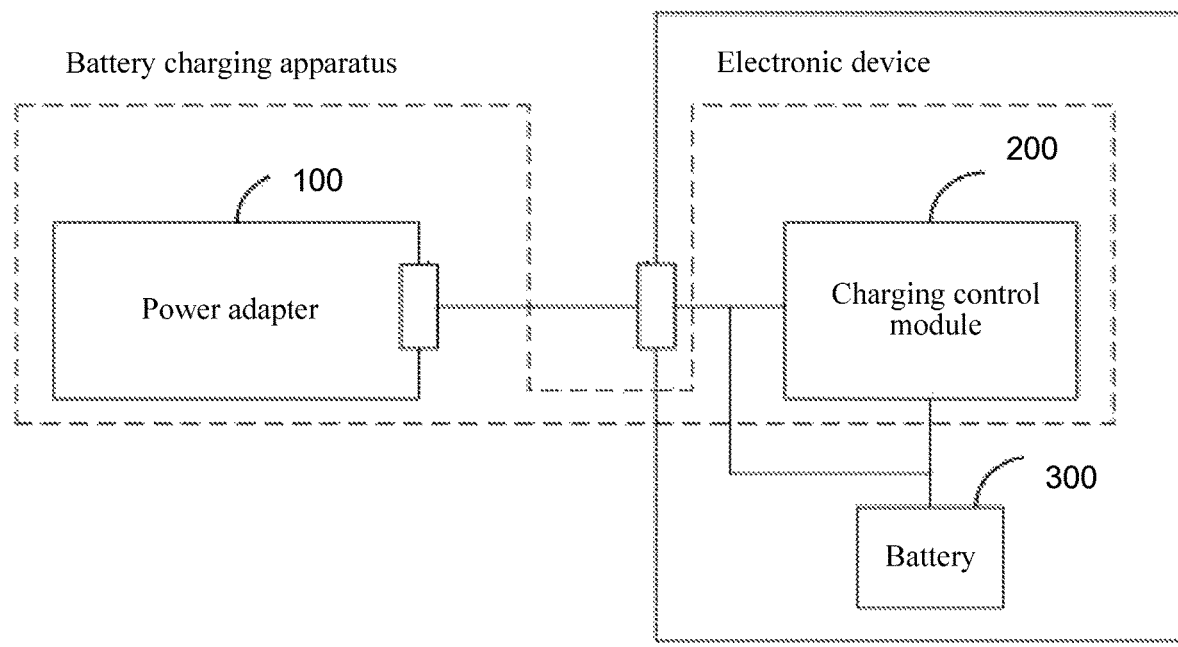
FIG. 1 is an electronic device charging control apparatus.

As shown in FIG. 1, an electronic device charging control apparatus is provided. In a process of charging a battery 300 in an electronic device by the electronic device charging control apparatus, a power adapter 100 first charges the battery 300 by means of constant-voltage output. After receiving a fast charging instruction command sent by a charging control module 200, the power adapter 100 adjusts an output voltage according to a battery voltage fed back by the charging control module 200, and adjusts, when the output voltage meets a fast charging voltage condition preset by the charging control module 200, an output current and the output voltage according to a fast charging current value and a fast charging voltage value in order to perform fast charging on the battery 300. In addition, the charging control module 200 introduces a direct current from the power adapter 100 to charge the battery 300. In a fast charging process, the power adapter 100 further adjusts the output current in real time according to the output voltage of the power adapter 100 and the battery voltage such that fast charging of the battery 300 is implemented by adjusting the output current and the output voltage of the power adapter 100.

It can be learned from the foregoing that in the technical solution, the power adapter obtains, in a real-time communication manner, feedback information of a charging current and a charging voltage from the charging control module in the electronic device, and performs real-time adjustment in the power adapter. The technical solution is applicable to a scenario in which a requirement on real-time adjustment is relatively low in a charging process. In a charging scenario in which a requirement on real-time adjustment is relatively high, if a current required by a terminal load suddenly decreases and output adjustment of the power adapter is not performed in time, the charging current flowing to the battery suddenly increases. This easily causes a potential safety threat to a charging circuit and a charged battery in the electronic device.

Figure 2:
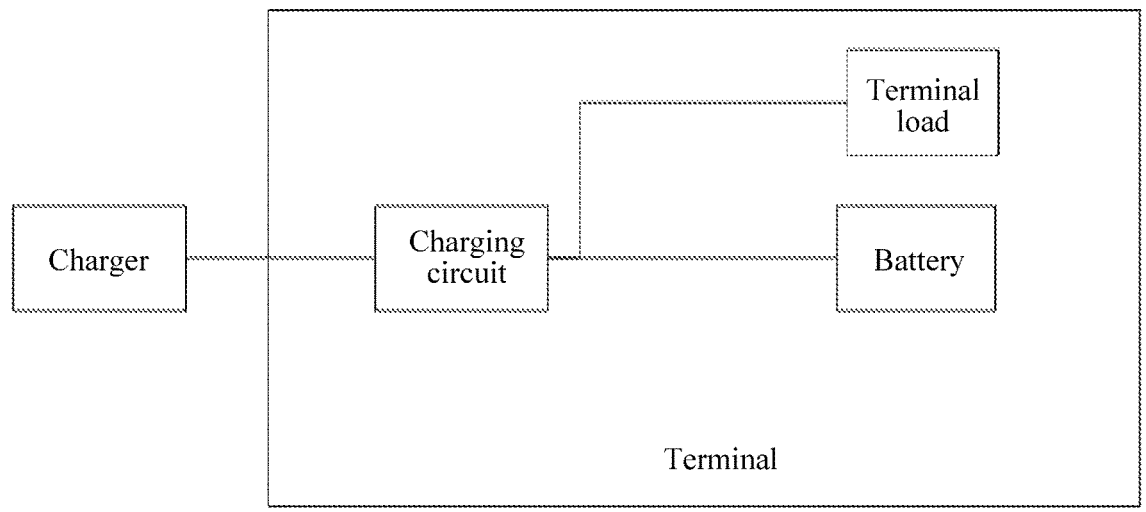
FIG. 2 is a schematic diagram of a charging system according to an embodiment of the present application.

As shown in FIG. 2, FIG. 2 is a charging system according to an embodiment of the present application. By means of the charging system provided in the present application, when a charging current suddenly increases, the charging current can be adjusted in order to prevent damage to a charging circuit and a battery due to an excessively high charging current.

Further, the charging system includes a terminal, a charger, and a connection cable. The terminal is connected to the charger using the connection cable.

The terminal may be an electronic device such as a smartphone, a tablet computer, an intelligent wearable device, or a computer.

As shown in FIG. 2, the terminal includes a terminal load, the battery, and the charging circuit of the terminal.

The charging circuit is respectively connected to the charger, the terminal load, and the battery.

It should be noted that the charging circuit is configured to detect voltages at two ends of the battery to obtain a voltage value of the battery, determine a charging mode according to the voltage value of the battery, and determine a current upper limit value according to the charging mode, and is further configured to detect a current of the charging circuit to obtain a current value of the charging circuit, determine whether the current value is greater than the current upper limit value, and when the current value is greater than the current upper limit value, adjust upward an impedance of an adjustment circuit according to the current value.

Further, the charging circuit is further configured to determine a current lower limit value according to the charging mode, determine whether the current value is less than the current lower limit value, and when the current value is less than the current lower limit value, adjust downward the impedance of the adjustment circuit according to the current value.

It can be learned from the foregoing that by means of the charging circuit provided in the present application, in a scenario in which a charging current suddenly increases during charging because a current consumed by a terminal load decreases and an output current from a power adapter cannot be adjusted in time, an impedance of the charging circuit can be adjusted in a charging process to decrease the charging current in order to prevent damage to the battery or the charging circuit due to an excessively high charging current, and further ensure charging safety. Further, after the charger adjusts downward the output current, the charging current decreases. In this case, the impedance of the adjustment circuit in the charging circuit may be adjusted downward to increase the charging current in order to ensure charging efficiency.

Figure 3:
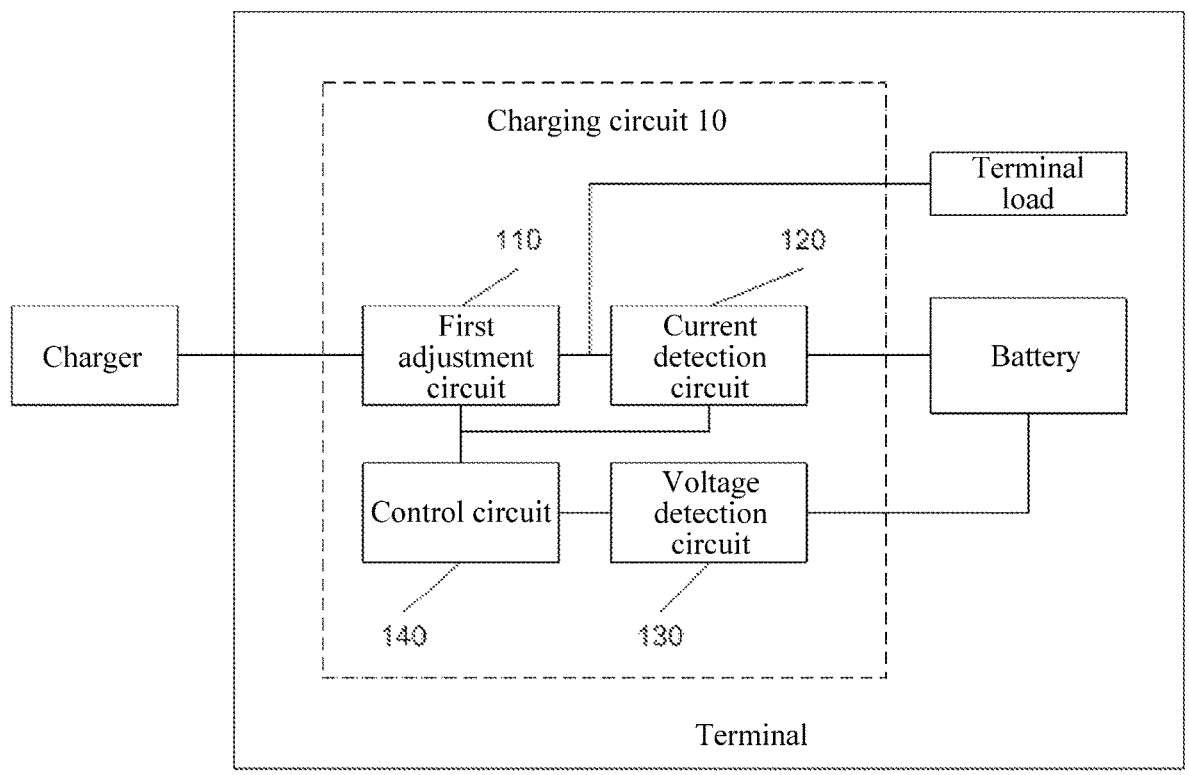
FIG. 3 is a schematic diagram of a charging circuit according to an embodiment of the present application.

As shown in FIG. 3, FIG. 3 shows a specific implementation of a charging circuit 10. The charging circuit 10 is respectively connected to a charger, a terminal load, and a battery such that when charging the battery using the charging circuit 10, the charger can further supply power to the terminal load.

Further, the charging circuit 10 includes a first adjustment circuit 110, a current detection circuit 120, a voltage detection circuit 130, and a control circuit 140.

As shown in FIG. 3, the first adjustment circuit 110 is connected to a positive electrode of the charger, a second end of the first adjustment circuit 110 is connected to a first end of the current detection circuit 120, the second end of the first adjustment circuit 110 is further connected to the terminal load, and a third end of the first adjustment circuit 110 is connected to the control circuit 140.

It should be noted that the first adjustment circuit may be a metal oxide semiconductor (MOS) transistor (that is, a MOS field effect transistor (FET) which may be also referred to as a metal insulator transistor). It may be understood that the MOS transistor has three ports. The three ports are respectively a G electrode, an S electrode, and a D electrode.

The first end may be the S electrode, the second end may be the D electrode, and the third end may be the G electrode.

Alternatively, the first end may be the D electrode, the second end may be the S electrode, and the third end may be the G electrode. Further, the first adjustment circuit may adjust an impedance of the first adjustment circuit by adjusting drive voltages at G and S ends.

A second end of the current detection circuit 120 is connected to a positive electrode of the battery, and a negative electrode of the battery is connected to the charger. Alternatively, the current detection circuit 120 is connected in series between the negative electrode of the battery and the charger, and a detection end of the voltage detection circuit 130 is connected in parallel at the positive and negative electrodes of the battery.

It may be understood that one end of the voltage detection circuit 130 is connected to the positive electrode of the battery, and another end is connected to the negative electrode of the battery. An output end of the voltage detection circuit 130 is further connected to the control circuit 140. It may be understood according to the connection manner that the voltage detection circuit 130 is configured to detect voltages at two ends of the battery to obtain a voltage value of the battery, and send the voltage value of the battery to the control circuit 140.

The current detection circuit 120 is configured to detect a current of the charging circuit to obtain a current value of the charging circuit, and send the current value to the first adjustment circuit 110.

The control circuit 140 is configured to determine a charging mode according to the voltage value of the battery, and determine a current upper limit value according to the charging mode.

For example, the control circuit 140 searches the following table according to the voltage value of the battery to determine the charging mode.

| Charging mode | Battery voltage value |
| --- | --- |
| Not charged | ≤2.8 volts (V) |
| 8 amperes (A) fast charging | 2.8-4.2 V |
| 6 A fast charging | 4.2-4.3 V |
| 4 A fast charging | 4.3-4.4 V |
| Charging completed | Battery voltage: 4.4 V; charging current: less than 0.03 A |

Further, the control circuit 140 searches the following table according to the charging mode to determine the current upper limit value.

| Charging mode | Current upper limit value and current lower limit value | Adjustment manner |
| --- | --- | --- |
| 8 A fast charging | Greater than 8.3 A or less than 7.7 A | Constant-current control |
| 6 A fast charging | Greater than 6.3 A or less than 5.7 A | Constant-current control |
| 4 A fast charging | Greater than 4.3 A or less than 3.7 A | Constant-current control |
| 4.4 V constant-voltage charging | A battery voltage reaches 4.4 V | Not adjusted |

The first adjustment circuit 110 is configured to obtain the current value and the current upper limit value, and is further configured to determine whether the current value is greater than the current upper limit value, and when the current value is greater than the current upper limit value, adjust upward an impedance of the first adjustment circuit according to the current value.

It should be noted that an objective of adjusting upward the impedance of the first adjustment circuit 110 is to decrease a charging current, that is, a larger current value indicates a higher adjusted impedance of the first adjustment circuit. However, the impedance of the first adjustment circuit 110 usually has a default maximum value or a manually specified maximum value. When the impedance of the first adjustment circuit 110 is adjusted to the maximum value and the charging current is still greater than the current upper limit value, the first adjustment circuit 110 is disconnected and sends an alarm to the control circuit 140 such that the control circuit 140 re-configures a related charging parameter (for example, an output voltage of the charger or an output current of the charger) for attempt of re-charging.

Further, it should be noted that when the charging current is greater than the current upper limit value, interaction needs to be performed with the charger such that the charger adjusts downward the output current, or output power, or the output voltage.

The current detection circuit 120 is further connected to the control circuit 140.

The current detection circuit 120 is further configured to send the current value to the control circuit 140.

The control circuit 140 is configured to determine whether the current value is greater than the current upper limit value, and when the current value is greater than the current upper limit value, send an adjustment instruction to the charger such that the charger adjusts downward output power, an output current, or an output voltage.

Further, it should be noted that when the charger adjusts downward the output current, the output voltage, or the output power, the current of the charging circuit decreases. If a current value of a decreased current is less than a current lower limit value, to ensure charging efficiency, the impedance of the first adjustment circuit 110 needs to be adjusted downward in order to increase the charging current.

The control circuit 140 is further configured to determine a current lower limit value according to the charging mode. The first adjustment circuit 110 is further configured to obtain the current lower limit value, determine whether the current value is less than the current lower limit value, and when the current value is less than the current lower limit value, adjust downward the impedance of the first adjustment circuit according to the current value.

It should be noted that if the impedance of the first adjustment circuit is currently relatively high, the output current of the charger decreases after the control circuit interacts with the charger. In this case, the charging current of the charging circuit decreases and the charging efficiency is affected. To ensure the charging efficiency of the battery, the impedance of the first adjustment circuit needs to be adjusted downward to increase the charging current.

Figure 4:
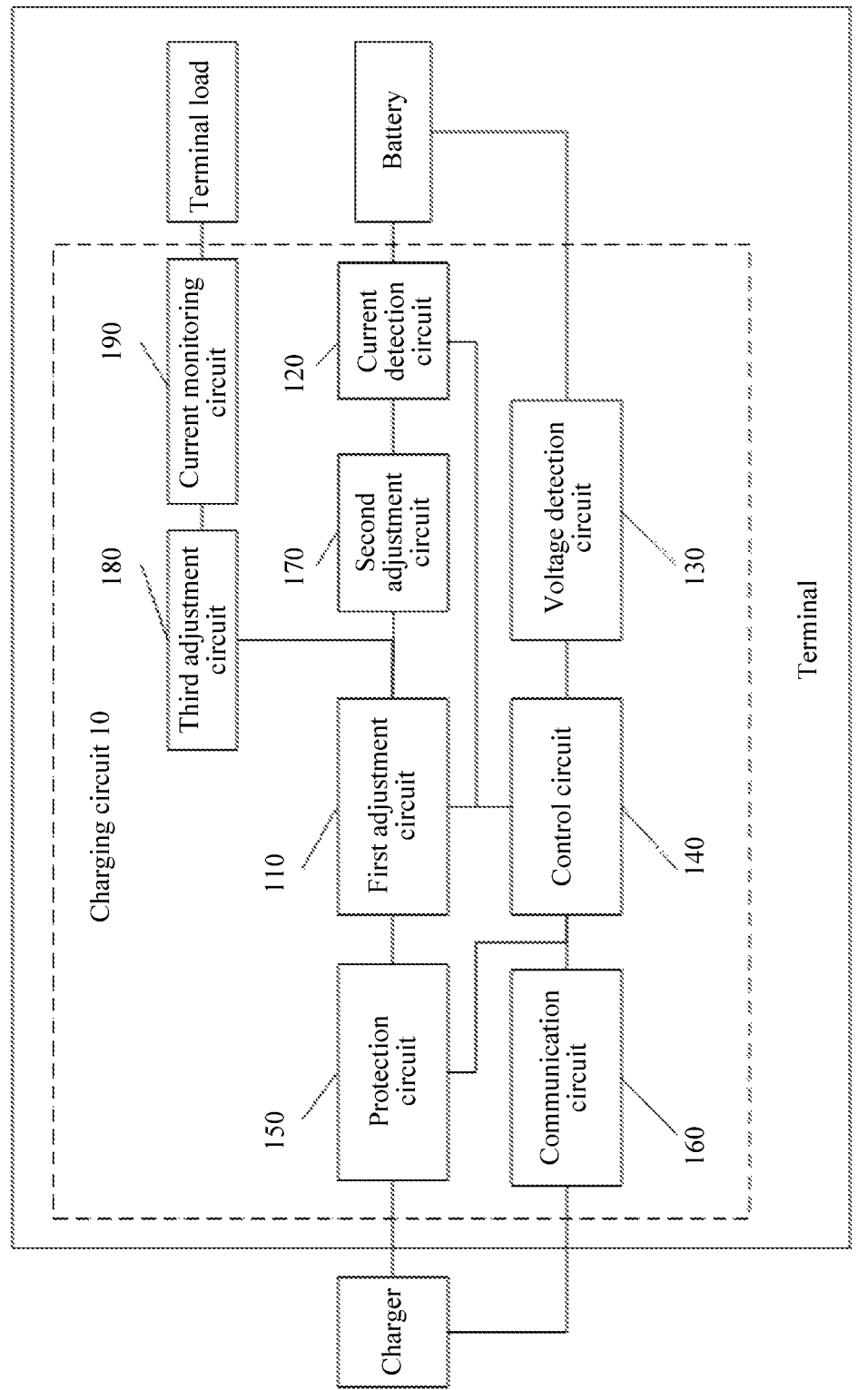
FIG. 4 is a schematic diagram of a charging circuit according to another embodiment of the present application.

Based on the charging circuit shown in FIG. 3, to prevent an overvoltage or an overcurrent, the charging circuit 10, shown in FIG. 4, further includes a protection circuit 150.

As shown in FIG. 4, the protection circuit 150 is connected in series between the charger and the first end of the first adjustment circuit 110. The control circuit 140 is further connected to the protection circuit 150.

The control circuit 140 is further configured to determine a protection trigger condition according to the charging mode, and send the protection trigger condition to the protection circuit 150.

For example, the control circuit 140 may search the following table according to the charging mode to determine the protection trigger condition.

| Charging mode | Overcurrent protection threshold | Battery overvoltage protection threshold | Charging cut-off |
| --- | --- | --- | --- |
| 8 A fast charging | 10.5 A | 4.41 V | 4.4 V |
| 6 A fast charging | 8.5 A | | |
| 4 A fast charging | 6.5 A | | |
| 4.4 V constant-voltage charging | 4.5 A | | |

The protection circuit 150 is configured to detect an output current of the charger to determine an output current value, determine whether the output current value meets the protection trigger condition, and when the output current value meets the protection trigger condition, open a switch to interrupt charging.

It can be learned from the foregoing table that the protection trigger condition includes a current protection trigger condition and a voltage protection trigger condition. That is, the protection circuit 150 is further configured to determine whether the output current value is greater than the current protection trigger condition (an overcurrent protection threshold), and when the output current value is greater than the current protection trigger condition, open the switch to interrupt charging.

It may be understood that the protection circuit 150 may detect whether a voltage of the battery is an overvoltage and detect whether the output voltage of the charger is an overvoltage. Therefore, the voltage protection trigger condition includes a battery voltage protection trigger condition and a charger voltage trigger protection condition. Further, the voltage of the battery corresponds to the battery voltage protection trigger condition, and the output voltage of the charger corresponds to the charger voltage protection trigger condition.

The protection circuit 150 is further connected to the voltage detection circuit 130 to obtain the voltage value of the battery.

The protection circuit 150 is further configured to detect a voltage of the battery to determine a voltage value of the battery, determine whether the voltage value of the battery is greater than the battery voltage protection trigger condition (an overvoltage protection threshold).

The protection circuit is further configured to detect the output voltage of the charger to obtain the output voltage value, determine whether the output voltage value is greater than the charger voltage protection trigger condition, and when the output voltage value is greater than the charger voltage protection trigger condition, open the switch to interrupt charging.

As shown in FIG. 4, the charging circuit 10 further includes a communication circuit 160.

The communication circuit 160 is connected to the control circuit 140.

The control circuit 140 is further configured to send the charging mode to the communication circuit 160.

The communication circuit 160 is configured to send the charging mode to the charger such that the charger performs charging according to the charging mode.

It should be noted that the communication circuit may be connected to the charger using a connection cable or may interact with the charger in a wireless manner to perform information transfer.

As shown in FIG. 4, to adjust the charging current more precisely, the charging circuit further includes a second adjustment circuit 170. The second adjustment circuit may be a MOS transistor, or may be a slide rheostat.

The second adjustment circuit 170 is connected in series between the second end of the first adjustment circuit 110 and the current detection circuit 120. Alternatively, the second adjustment circuit 170 may be connected in series between the positive electrode of the battery and the current detection circuit 120.

The second adjustment circuit 170 is further connected to the control circuit 140.

The control circuit 140 is further configured to determine an adjustment threshold of the second adjustment circuit 170 according to the charging mode.

The second adjustment circuit 170 is configured to adjust an impedance of the second adjustment circuit according to the current value and the adjustment threshold of the second adjustment circuit.

Further, it should be noted that the adjustment threshold of the second adjustment circuit 170 also includes an upper threshold and a lower threshold. It may be understood that when the current value is greater than the upper threshold, the impedance of the second adjustment circuit 170 is adjusted upward to decrease the charging current, or when the current value is less than the lower threshold, the impedance of the second adjustment circuit is adjusted downward to increase the charging current.

As shown in FIG. 4, to prevent a current required by the terminal load from suddenly decreasing, the charging circuit 10 further includes a third adjustment circuit 180 and a current monitoring circuit 190.

The third adjustment circuit 180 and the current monitoring circuit 190 are connected in series between the first adjustment circuit 110 and the terminal load.

The current monitoring circuit 190 is configured to monitor a decrease amplitude of a current of the terminal load, and when the decrease amplitude exceeds a preset threshold, send an adjustment instruction to the third adjustment circuit 180.

The third adjustment circuit 180 is configured to adjust upward an impedance of the third adjustment circuit according to the adjustment instruction.

Further, it should be noted that because power consumed by the terminal load decreases, the third adjustment circuit 180 needs to perform current shunting to prevent the charging current of the charging circuit from being excessively high. When monitoring that the power consumed by the terminal load decreases, a terminal instructs the charger to decrease output power or the output current. After receiving an instruction from the terminal, the charger decreases the output power or the output current. This adjustment function takes time. After the adjustment is completed, the current of the terminal load decreases. In this case, the third adjustment unit decreases the impedance or restores the impedance to a state before the impedance is adjusted upward.

Further, the third adjustment circuit 180 is further configured to restore, after preset duration, the impedance of the third adjustment circuit 180 to a state before the impedance is adjusted upward.

It should be noted that the preset duration is greater than current adjustment duration of the charger.

After the current required by the terminal load decreases, a current of the charging circuit increases. In this case, the control circuit sends, to the charger, an instruction for decreasing the output current. After receiving the instruction, the charger has the current adjustment duration, that is, the charger adjusts the current to a target value in the current adjustment duration.

In conclusion, referring to FIG. 3 and FIG. 4, it may be learned that to prevent the power consumed by the terminal load or the current from suddenly decreasing and prevent an excessively high charging current due to that the charger cannot decrease the output power or the current in time, the present application provides a charging circuit. The charging circuit includes the adjustment circuit that can perform current shunting in time in order to prevent damage to the charging circuit or the battery due to an excessively high charging current. Further, after the charger adjusts downward the output current, the charging current decreases. In this case, the impedance of the adjustment circuit in the charging circuit may be adjusted downward to increase the charging current in order to ensure charging efficiency.

Figure 5:
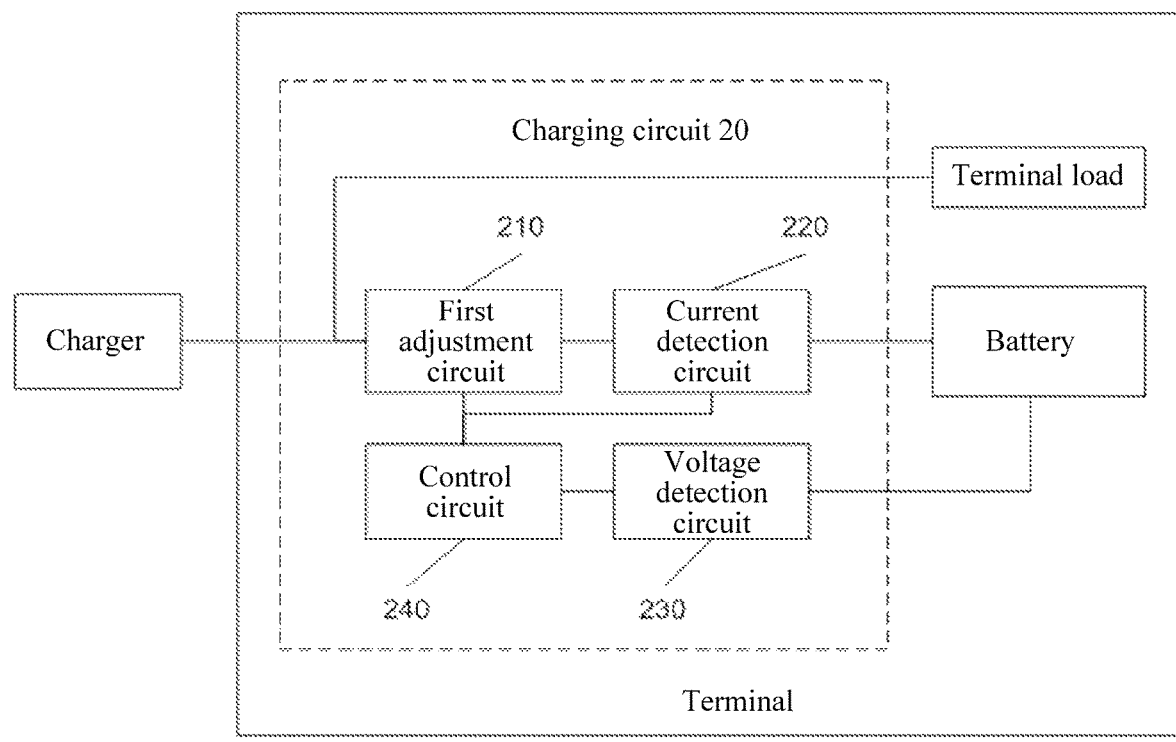
FIG. 5 is a schematic diagram of a charging circuit according to another embodiment of the present application.

As shown in FIG. 5, FIG. 5 shows a specific implementation of a charging circuit 20. The charging circuit 20 is respectively connected to a charger, a terminal load, and a battery. The charging circuit 20 includes a first adjustment circuit 210, a current detection circuit 220, a voltage detection circuit 230, and a control circuit 240.

Different from the charging circuit shown in FIG. 3, the first adjustment circuit 210 in the charging circuit 20 is deployed in a charging branch circuit.

Further, a first end of the first adjustment circuit 210 is connected to the charger, the first end of the first adjustment circuit 210 is further connected to the terminal load, a second end of the first adjustment circuit 210 is connected to a first end of the current detection circuit 220, and a third end of the first adjustment circuit 210 is connected to the control circuit 240.

The first adjustment circuit may be a MOS transistor.

It may be understood that the first end of the first adjustment circuit 210 is connected to a positive electrode of the charger.

A second end of the current detection circuit 220 is connected to a positive electrode of the battery. Alternatively, the current detection circuit 220 may be connected in series between a negative electrode of the battery and the charger.

The negative electrode of the battery is connected to the charger. It may be understood that the negative electrode of the battery is connected to a negative electrode of the charger.

A detection end of the voltage detection circuit 230 is connected in parallel at the positive and negative electrodes of the battery, and an output end of the voltage detection circuit 230 is connected to the control circuit 240.

The voltage detection circuit 230 is configured to detect voltages at two ends of the battery to obtain a voltage value of the battery, and send the voltage value of the battery to the control circuit 240.

The current detection circuit 220 is configured to detect a current of the charging circuit to obtain a current value of the charging circuit, and send the current value to the first adjustment circuit 210.

The control circuit 240 is configured to determine a charging mode according to the voltage value of the battery, and determine a current upper limit value according to the charging mode.

The first adjustment circuit 210 is configured to obtain the current value and the current upper limit value, and is further configured to determine whether the current value is greater than the current upper limit value, and when the current value is greater than the current upper limit value, adjust upward an impedance of the first adjustment circuit according to the current value.

Further, it should be noted that the current detection circuit 210 is further connected to the control circuit 240.

The current detection circuit 210 is further configured to send the current value to the control circuit 240.

The control circuit 240 is configured to determine whether the current value is greater than the current upper limit value, and when the current value is greater than the current upper limit value, send an adjustment instruction to the charger such that the charger adjusts downward output power, an output current, or an output voltage.

Further, it should be noted that after the control circuit 240 interacts with the charger, the charger adjusts downward the output current. In this case, a charging current decreases. To ensure charging efficiency, the impedance of the first adjustment circuit 210 needs to be adjusted downward. Details are as follows.

The control circuit 240 is further configured to determine a current lower limit value according to the charging mode.

The first adjustment circuit 210 is configured to obtain the current lower limit value, determine whether the current value is less than the current lower limit value, and when the current value is less than the current lower limit value, adjust downward the impedance of the adjustment circuit according to the current value.

Figure 6:
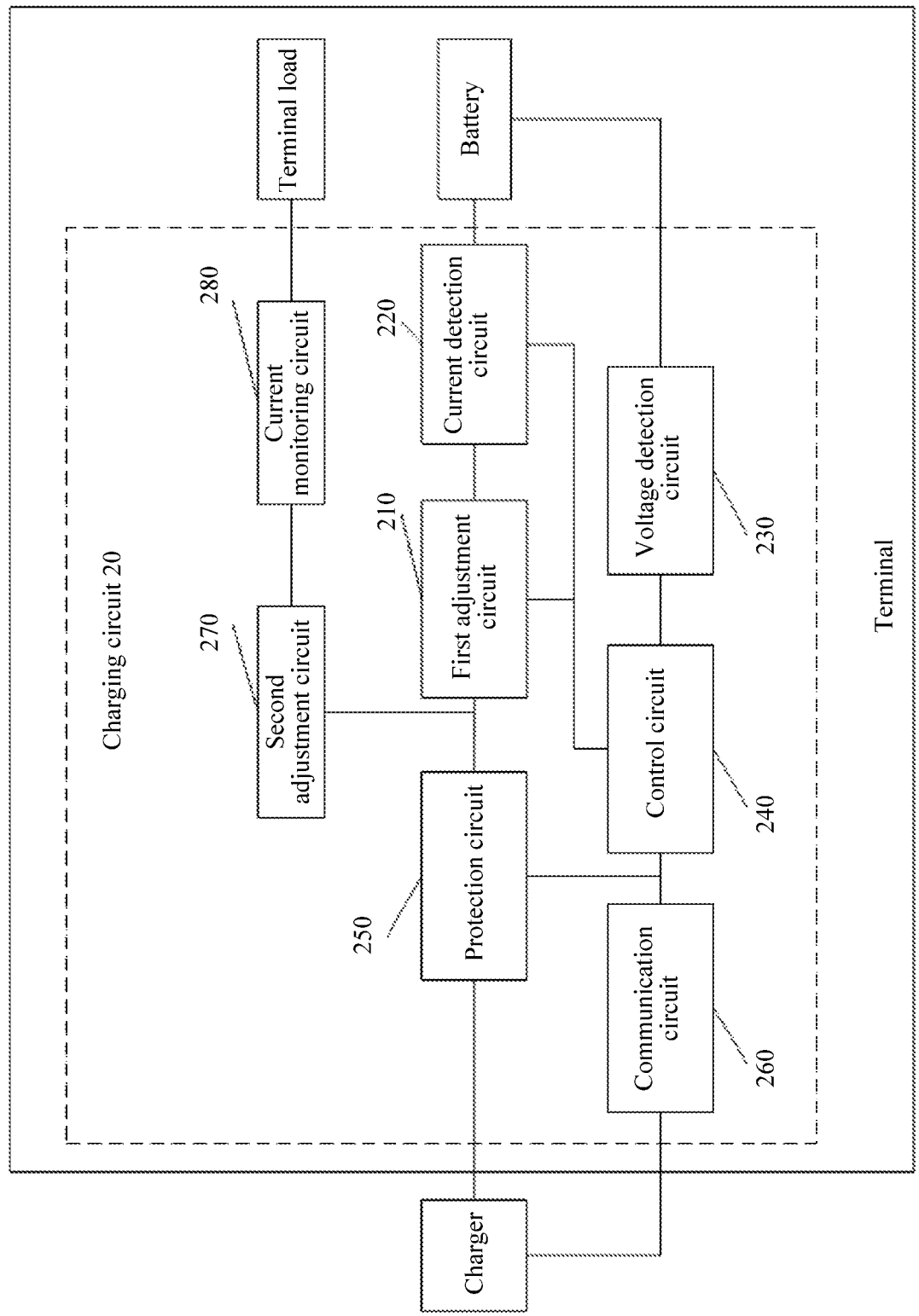
FIG. 6 is a schematic diagram of a charging circuit according to another embodiment of the present application.

Based on FIG. 5, a charging circuit 20 shown in FIG. 6 further includes a protection circuit 250. The protection circuit 250 may be configured to prevent an overvoltage or an overcurrent.

Further, the protection circuit 250 is connected in series between the charger and the first adjustment circuit 210.

The control circuit 240 is further connected to the protection circuit 250.

The control circuit 240 is further configured to determine a protection trigger condition according to the charging mode, and send the protection trigger condition to the protection circuit 250.

The protection circuit 250 is configured to detect the output current of the charger to determine an output current value, determine whether the output current value meets the protection trigger condition, and when the output current value meets the protection trigger condition, open a switch to interrupt charging.

It may be understood that the protection trigger condition includes both a current trigger protection condition and a voltage trigger protection condition.

Further, the protection circuit 250 is configured to detect the output current of the charger to determine the output current value, determine whether the output current value is greater than the current protection trigger condition, and when the output current value is greater than the current protection trigger condition, open the switch to interrupt charging.

It may be understood that the protection circuit 250 may detect whether a voltage of the battery is an overvoltage and detect whether the output voltage of the charger is an overvoltage. Therefore, the voltage protection trigger condition includes a battery voltage protection trigger condition and a charger voltage trigger protection condition. Further, the voltage of the battery corresponds to the battery voltage protection trigger condition, and the output voltage of the charger corresponds to the charger voltage protection trigger condition. It should be noted that the protection circuit 250 is further connected to the voltage detection circuit 230 to obtain the voltage value of the battery.

The protection circuit 250 is further configured to determine whether the voltage value of the battery is greater than the voltage protection trigger condition, and when the voltage value of the battery is greater than the voltage protection trigger condition, open the switch to interrupt charging.

The protection circuit 250 is further configured to detect the output voltage of the charger to obtain an output voltage value, determine whether the output voltage value is greater than the charger voltage protection trigger condition, and when the output voltage value is greater than the charger voltage protection trigger condition, open the switch to interrupt charging.

As shown in FIG. 6, the charging circuit 20 further includes a communication circuit 260. Further, the communication circuit 260 is connected to the control circuit 240. The control circuit 240 needs to interact with the charger to control the charger to adjust the output power, the output voltage, or the output current.

Details are as follows.

The control circuit 240 is further configured to send the charging mode to the communication circuit 260.

The communication circuit 260 is configured to send the charging mode to the charger such that the charger performs charging according to the charging mode.

It should be noted that the communication circuit 260 may be connected to the charger using a connection cable to perform information transfer. Alternatively, the communication circuit may interact with the charger in a wireless manner.

As shown in FIG. 6, the charging circuit 20 further includes a second adjustment circuit 270 and a current monitoring circuit 280.

The second adjustment circuit 270 and the current monitoring circuit 280 are connected in series between the first end of the first adjustment circuit 210 and the terminal load.

The current monitoring circuit 280 is configured to monitor a decrease amplitude of a current of the terminal load, and when the decrease amplitude exceeds a preset threshold, send an adjustment instruction to the second adjustment circuit.

The second adjustment circuit 270 is configured to adjust upward an impedance of the second adjustment circuit according to the adjustment instruction.

Further, it should be noted that the second adjustment circuit 270 is further configured to restore, after preset duration, the impedance of the second adjustment circuit 270 to a state before the impedance is adjusted upward.

Figure 7:
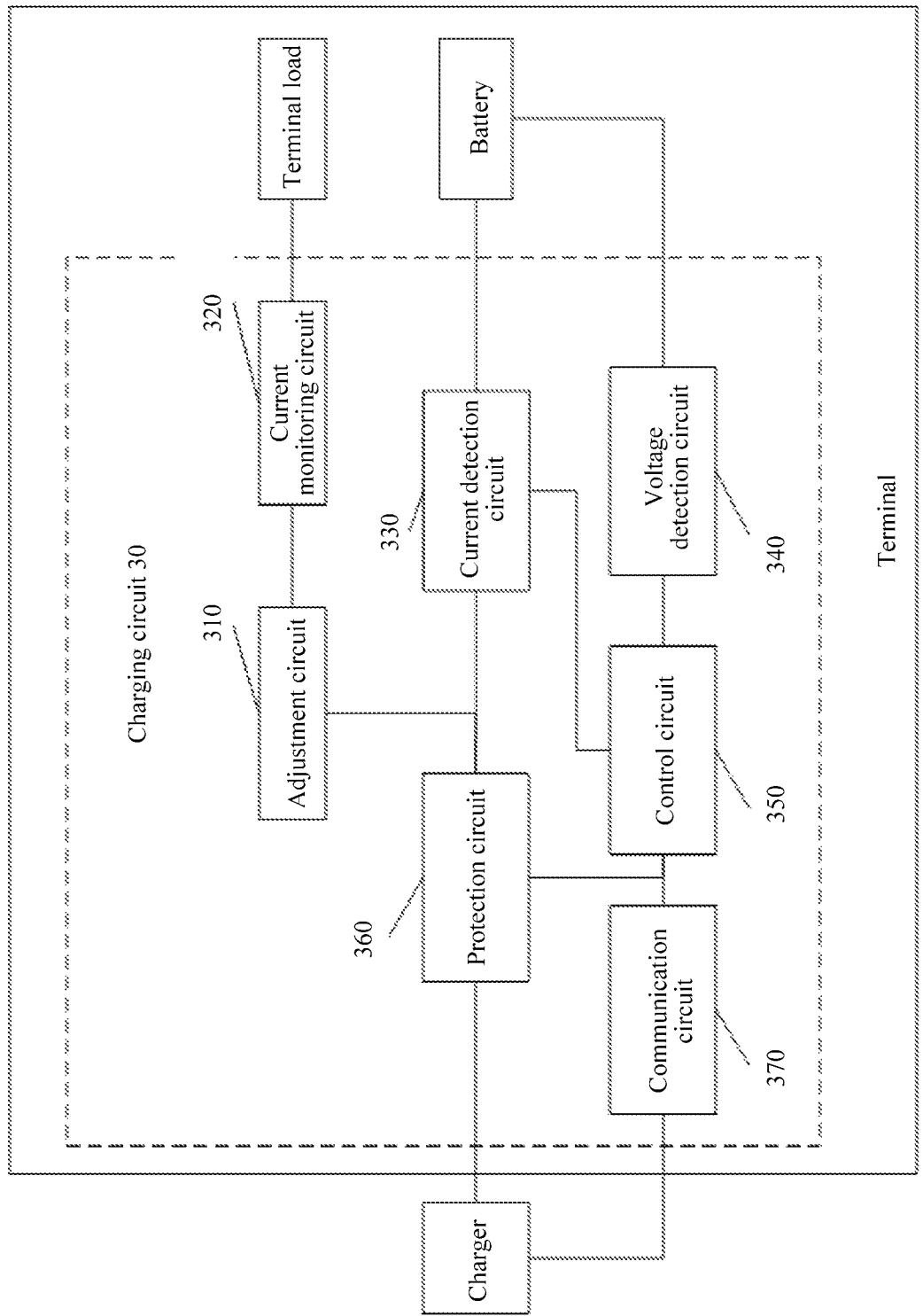
FIG. 7 is a schematic diagram of a charging circuit according to another embodiment of the present application.

As shown in FIG. 7, FIG. 7 provides another specific charging circuit 30. The charging circuit 30 is respectively connected to a charger, a terminal load, and a battery. The charging circuit 30 includes an adjustment circuit 310, a current monitoring circuit 320, a current detection circuit 330, a voltage detection circuit 340, a control circuit 350, a protection circuit 360, and a communication circuit 370.

A first end of the adjustment circuit 310 is connected to the charger, a second end of the adjustment circuit 310 is connected to a first end of the current monitoring circuit 320, and a second end of the current monitoring circuit 320 is connected to the terminal load.

A positive electrode of the charger is connected to a positive electrode of the battery, and a negative electrode of the charger is connected to a negative electrode of the battery.

The current monitoring circuit 320 is configured to monitor a decrease amplitude of a current of the terminal load, and when the decrease amplitude exceeds a preset threshold, send an adjustment instruction to the adjustment circuit 310.

The adjustment circuit 310 is configured to adjust upward an impedance of the adjustment circuit according to the adjustment instruction.

Further, it should be noted that the adjustment circuit 310 is further configured to, after preset duration for which the impedance of the adjustment circuit is adjusted upward, restore the impedance of the adjustment circuit 310 to a state before the impedance is adjusted upward.

The protection circuit 360 and the current detection circuit 330 are connected in series between the charger and the battery.

The voltage detection circuit 340 is connected in parallel at two ends of the battery.

The control circuit 350 is connected to the current detection circuit 330, is further connected to the voltage detection circuit 340, and is further connected to the protection circuit 360.

The voltage detection circuit 340 is configured to detect voltages at the two ends of the battery to obtain a voltage value of the battery, and send the voltage value of the battery to the control circuit 350.

The current detection circuit 330 is configured to detect a current of the charging circuit to obtain a current value of the charging circuit.

The control circuit 350 is configured to determine a charging mode according to the voltage value of the battery.

The control circuit 350 is further configured to, when the current value is greater than a current upper limit value, send, to the charger using the communication circuit 370, an instruction for adjusting downward an output voltage or output power.

The control circuit 350 is further configured to, when the current value is less than a current lower limit value, send, to the charger using the communication circuit 370, an instruction for adjusting upward the output voltage or the output power.

The protection circuit 360 is configured to detect an output current of the charger to determine an output current value, determine whether the output current value meets the protection trigger condition, and when the output current value meets the protection trigger condition, open a switch to interrupt charging.

Figure 8:
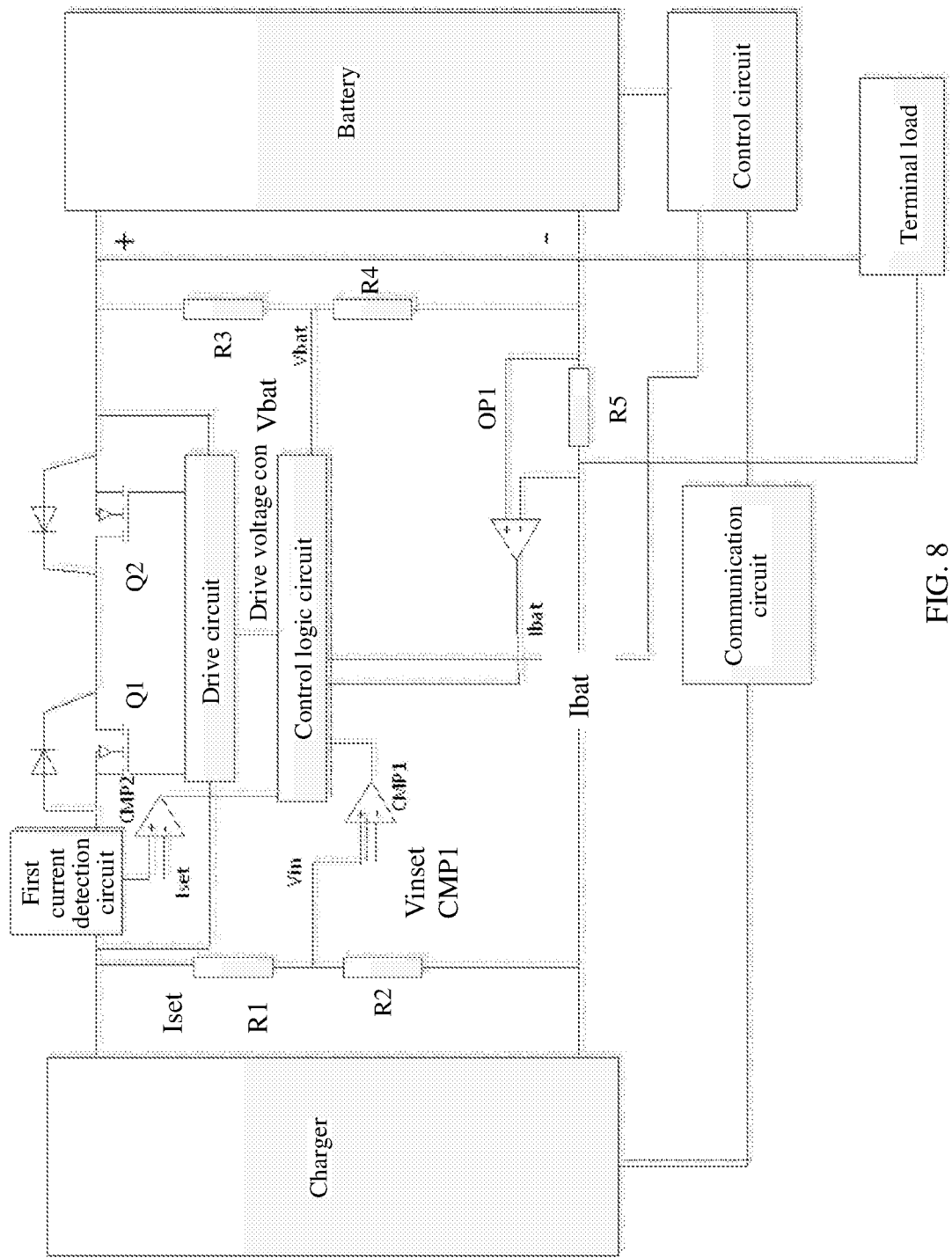
FIG. 8 is a schematic diagram of a charging circuit according to another embodiment of the present application.
Figure 9:
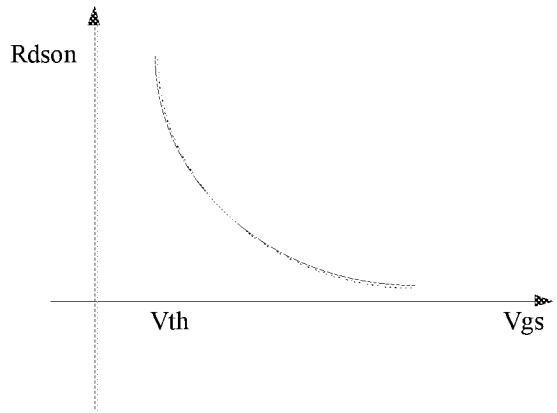
FIG. 9 is a line graph of a relationship between a drain-source on-state resistance of a MOS transistor and a drive voltage according to another embodiment of the present application.

In another embodiment of the present application, a specific charging circuit is provided, as shown in FIG. 8. The charging circuit adjusts a charging current using a feature that a drain-source on-state resistance of a MOS transistor changes with a drive voltage. A relationship between the drain-source on-state resistance of the MOS transistor and the drive voltage is shown in FIG. 9.

Further, when the drive voltage reaches a switch-on voltage, the MOS transistor is switched on, and a drain-source on-state resistance is maximum. As a vgs voltage (that is, the drive voltage) increases, the drain-source on-state resistance gradually decreases.

When the drive voltage is lower than Vth, the MOS transistor is switched off, and the charging ends.

Based on the principle, the MOS transistor may be used as a switching tube and an adjustment component to implement adjustment and protection in a charging process.

The charging circuit shown in FIG. 8 includes a protection circuit, an adjustment circuit, a first current detection circuit, a second current detection circuit, a voltage detection circuit, a communication circuit, and a control circuit.

The protection circuit includes resistors R1 and R2 and comparators CMP1 and CMP2.

Further, the R1 and the R2 form a voltage division network and detect an input voltage. The CMP1 compares a detected voltage with an input overvoltage threshold to determine whether the detected voltage is overvoltage.

The first current detection circuit is configured to detect a current passing through the protection circuit and the adjustment circuit, and may be further a resistor or an amplification circuit. Alternatively, a detected current value may be obtained by dividing a voltage drop between two ends of the MOS transistor by a drain-source on-state resistance value of the MOS transistor. The detected current value is compared with an overcurrent threshold in a comparison circuit of the CMP2 to determine whether an overcurrent occurs.

The voltage detection circuit includes resistors R3 and R4.

The R3 and the R4 form a voltage division network, detect a voltage of a battery to obtain a voltage value of the battery, and provide the voltage value of the battery for the control circuit. The control circuit is configured to determine a protection threshold of the protection circuit and an adjustment threshold of the adjustment circuit according to the voltage value of the battery.

The second current detection circuit includes a resistor R5 and an amplification circuit OP1.

Further, the R5 and the OP1 form a charging current sampling and amplification circuit. The OP1 may be one of an in-phase amplification circuit, a reverse amplification circuit, or a differential amplification circuit.

The second current detection circuit is configured to detect a charging current.

The adjustment circuit includes two MOS transistors (Q1 and Q2), a drive circuit, and a control logic circuit. It should be noted that the adjustment circuit may alternatively include one MOS transistor because a current adjustment function can also be achieved using one MOS transistor.

The control logic circuit compares the charging current with a specified lower limit value of a charging current adjustment threshold. If the charging current is lower than the lower limit value of the charging current adjustment threshold, the control logic circuit gradually increases the drive voltage of the MOS transistor. The drain-source on-state resistance of the MOS transistor gradually decreases until the drain-source on-state resistance of the MOS transistor reaches a lower limit value in order to increase the charging current.

The control logic circuit compares the charging current with a specified upper limit value of the charging current adjustment threshold. If the charging current is higher than the upper limit of the charging current adjustment threshold, the control logic circuit decreases the drive voltage of the MOS transistor. The drain-source on-state resistance of the MOS transistor gradually increases in order to decrease the charging current.

The drive circuit includes a direct current (DC)/alternating current (AC) converting circuit and respectively outputs a voltage to the Q1 and the Q2 according to an instruction of the control logic circuit in order to control drain-source on-state resistances of the Q1 and the Q2.

The Q1 and the Q2 are connected in series to the battery. The two MOS transistors Q1 and Q2 control closing and opening of a charging path.

The charging circuit shown in FIG. 8 may adjust the charging current by following the following steps.

Step 1: The voltage detection circuit detects a voltage of the battery to obtain a voltage value of the battery, and sends the voltage value of the battery to the control circuit.

Step 2: The second current detection circuit detects a charging current to obtain a charging current value, and sends the charging current value to the control circuit.

Step 3: The control circuit selects a charging mode according to the voltage value of the battery, the control circuit may further configure a current protection threshold or a voltage protection threshold of the protection circuit according to the selected charging mode, and the control circuit may further configure an adjustment threshold range of the adjustment circuit according to the selected charging mode.

Step 4: Comparison circuits of the CMP1 and the CMP2 determine whether an overcurrent or an overvoltage occurs, and if the overcurrent or the overvoltage occurs, control logic circuit sends a switch-off command, and the Q1 or the Q2 is switched off.

Step 5: The control logic circuit compares a charging current with an upper limit and a lower limit of a specified charging current adjustment threshold, and if the charging current is lower than the lower limit of charging current adjustment threshold, the control logic circuit gradually increases a drive voltage of the MOS transistor such that a drain-source on-state resistance of the MOS transistor gradually decreases until the drain-source on-state resistance of the MOS transistor reaches the lower limit value in order to increase the charging current, or if the charging current is higher than the upper limit of charging current adjustment, the control logic circuit decreases a drive voltage of the MOS transistor such that a drain-source on-state resistance of the MOS transistor gradually increases in order to decrease the charging current.

Step 6: The control circuit receives a request that is for adjusting an output voltage of the charger and that is sent by the adjustment circuit, generates a charging power adjustment instruction according to the request, and feeds back the charging power adjustment instruction to an external charger using the communication circuit.

Step 7: The external charger adjusts output power according to the charging power adjustment instruction.

Step 8: When a current value or a voltage value that is at an end of the battery and that is obtained by the detection circuit reaches a charge cut-off threshold, the protection circuit is open, and the charging ends.

An embodiment of the present application further provides a charging method. The method further includes detecting a voltage of a battery to obtain a voltage value of the battery, selecting a charging mode according to the voltage value of the battery, where common charging modes include 8 A charging, 6 A charging, 4 A charging, and the like, determining a current upper limit value and a current lower limit value of an adjustment circuit according to the charging mode, when a charging current value exceeds the current upper limit value, adjusting upward an impedance of the adjustment circuit in order to decrease charging power at a battery end, then requesting a control circuit to adjust downward an output voltage of a charger, and after the charger adjusts downward the output voltage, gradually adjusting a drain-source on-state resistance of the adjustment circuit to a minimum, where when the voltage value of the battery reaches a charging voltage cut-off threshold and a charging current reaches a charging current cut-off threshold, the protection circuit is open and the charging ends.

Figure 10:
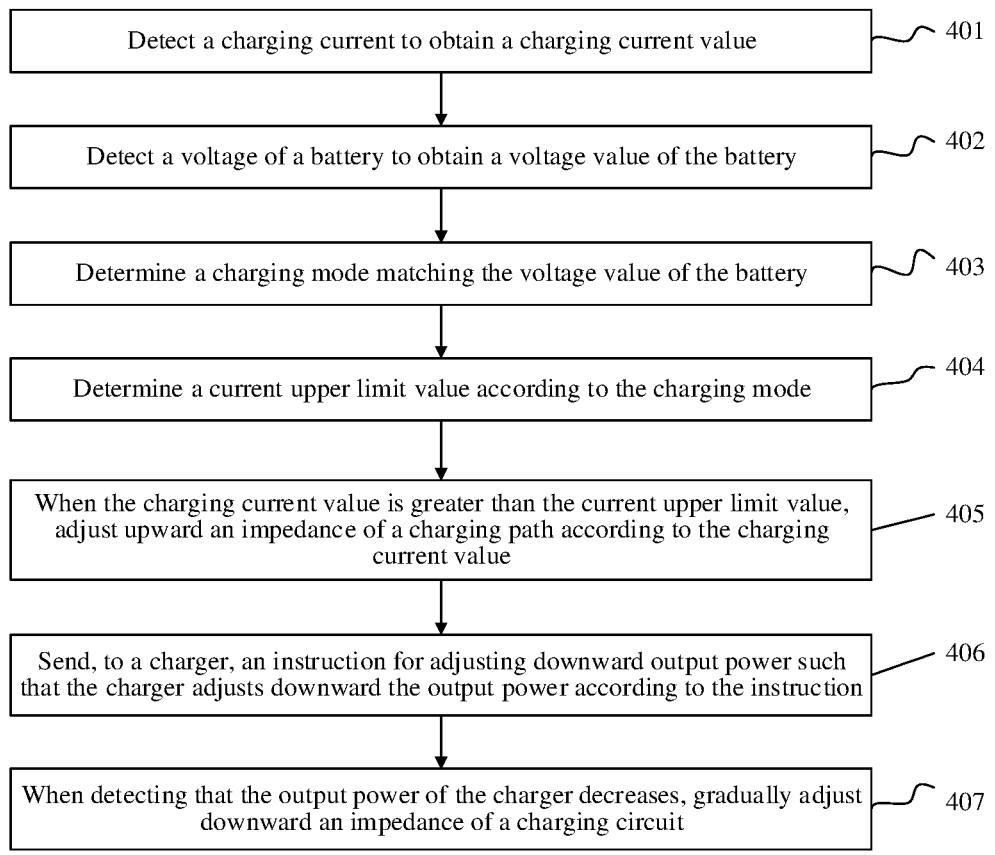
FIG. 10 shows a charging method according to another embodiment of the present application.

As shown in FIG. 10, FIG. 10 provides a charging method. The method includes the following steps.

Step 401: Detect a charging current to obtain a charging current value.

Step 402: Detect a voltage of a battery to obtain a voltage value of the battery.

Step 403: Determine a charging mode matching the voltage value of the battery.

Step 404: Determine a current upper limit value according to the charging mode.

Step 405: When the charging current value is greater than the current upper limit value, adjust upward an impedance of a charging path according to the charging current value.

Step 406: Send, to a charger, an instruction for adjusting downward output power such that the charger adjusts downward the output power according to the instruction.

Step 407: When detecting that the output power of the charger decreases, gradually adjust downward an impedance of a charging circuit.

Therefore, it may be learned that by means of the charging method provided in the present application, when the charging current suddenly increases, the charging current may be adjusted in order to prevent damage to the charging circuit and the battery due to an excessively high charging current. Further, after the charger adjusts downward an output current, the charging current decreases. In this case, an impedance of an adjustment circuit in the charging circuit may be adjusted downward to increase the charging current in order to ensure charging efficiency.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A charging circuit, comprising:
   a control circuit;
   a first adjustment circuit coupled to the control circuit, wherein a first end of the first adjustment circuit is coupled to a charger, wherein a second end of the first adjustment circuit is coupled to a first end of a battery and a terminal load, and wherein a third end of the first adjustment circuit is coupled to the control circuit;
   a current detection circuit coupled in series either:
      between the second end of the first adjustment circuit and the first end of the battery; or
      between a second end of the battery and the charger;
   a voltage detection circuit, wherein a detection end of the voltage detection circuit is coupled in parallel at the first end and the second end of the battery, wherein an output end of the voltage detection circuit is coupled to the control circuit, and wherein the voltage detection circuit is configured to detect voltages at two ends of the battery to obtain a voltage value of the battery,
   wherein the current detection circuit is configured to detect a current of the charging circuit to obtain a current value of the charging circuit,
   wherein the control circuit is configured to:
      determine a charging mode according to the voltage value; and
      determine a current upper limit value according to the charging mode, and
   wherein the first adjustment circuit is configured to adjust an impedance of the first adjustment circuit upward according to the current value when the current value is greater than the current upper limit value.

2. The charging circuit of claim 1, wherein the control circuit is further configured to determine a current lower limit value according to the charging mode, and wherein the first adjustment circuit is further configured to:
   obtain the current lower limit value;
   compare the current value with the current lower limit value to determine whether the current value is less than the current lower limit value; and
   adjust the impedance of the first adjustment circuit downward according to the current value when the current value is less than the current lower limit value.

3. The charging circuit of claim 1, further comprising a protection circuit coupled in series between the charger and the first end of the first adjustment circuit, and wherein the control circuit is further coupled to the protection circuit and configured to:
   determine a protection trigger condition according to the charging mode; and
   send the protection trigger condition to the protection circuit,
   wherein the protection circuit is configured to:
      detect an output current of the charger to determine an output current value;
      determine whether the output current value meets the protection trigger condition; and
      open a switch to interrupt charging when the output current value meets the protection trigger condition.

4. The charging circuit of claim 1, further comprising a communication circuit coupled to the control circuit, wherein the control circuit is further configured to send the charging mode to the communication circuit, and wherein the communication circuit is configured to send the charging mode to the charger.

5. The charging circuit of claim 1, further comprising a second adjustment circuit coupled in series between the second end of the first adjustment circuit and the first end of the battery, wherein the control circuit is further coupled to the second adjustment circuit and configured to determine an adjustment threshold of the second adjustment circuit according to the charging mode, and wherein the second adjustment circuit is configured to adjust an impedance of the second adjustment circuit according to the current value and the adjustment threshold.

6. The charging circuit of claim 1, further comprising a third adjustment circuit and a current monitoring circuit, wherein the third adjustment circuit and the current monitoring circuit are coupled in series between the second end of the first adjustment circuit and the terminal load, and wherein the current monitoring circuit is configured to:
   monitor for a decrease in an amplitude of a current of the terminal load; and send an adjustment instruction to the third adjustment circuit when the decrease in the amplitude exceeds a preset threshold, and wherein the third adjustment circuit is configured to adjust an impedance of the third adjustment circuit upward according to the adjustment instruction.

7. The charging circuit of claim 6, wherein the third adjustment circuit is further configured to restore, after a preset duration, the impedance of the third adjustment circuit to a state before the impedance of the third adjustment circuit is adjusted upward.

8. A charging circuit, comprising:
a control circuit;
a first adjustment circuit coupled to the control circuit, wherein a first end of the first adjustment circuit is coupled to a charger and a terminal load, wherein a second end of the first adjustment circuit is coupled to a first end of a battery, and wherein a third end of the first adjustment circuit is coupled to the control circuit;
a current detection circuit coupled in series either:
between the second end of the first adjustment circuit and the first end of the battery; or
between a second end of the battery and the charger;
a voltage detection circuit coupled to the control circuit, wherein a detection end of the voltage detection circuit is coupled in parallel at the first end and the second end of the battery, wherein an output end of the voltage detection circuit is coupled to the control circuit, and wherein the voltage detection circuit is configured to:
detect voltages at two ends of the battery to obtain a voltage value of the battery; and
send the voltage value of the battery to the control circuit,
wherein the current detection circuit is configured to:
detect a current of the charging circuit to obtain a current value of the charging circuit; and
send the current value to the first adjustment circuit,
wherein the control circuit is configured to:
determine a charging mode according to the voltage value; and
determine a current upper limit value according to the charging mode, and
wherein the first adjustment circuit is configured to adjust an impedance of the first adjustment circuit upward according to the current value when the current value is greater than the current upper limit value.

9. The charging circuit of claim 8, wherein the control circuit is further configured to determine a current lower limit value according to the charging mode, and wherein the first adjustment circuit is further configured to:
obtain the current lower limit value;
compare the current value with the current lower limit value to determine whether the current value is less than the current lower limit value; and
adjust the impedance of the first adjustment circuit downward according to the current value when the current value is less than the current lower limit value.

10. The charging circuit of claim 9, further comprising a communication circuit coupled to the control circuit, wherein the control circuit is further configured to send the charging mode to the communication circuit, and wherein the communication circuit is configured to send the charging mode to the charger to enable the charger to perform charging according to the charging mode.

11. The charging circuit of claim 8, further comprising a protection circuit coupled in series between the charger and the first end of the first adjustment circuit, and wherein the control circuit is further coupled to the protection circuit and configured to:
determine a protection trigger condition according to the charging mode; and
send the protection trigger condition to the protection circuit, and
wherein the protection circuit is configured to:
detect an output current of the charger to determine an output current value;
determine whether the output current value meets the protection trigger condition; and
open a switch to interrupt charging when the output current value meets the protection trigger condition.

12. The charging circuit of claim 8, further comprising a second adjustment circuit and a current monitoring circuit, wherein the second adjustment circuit and the current monitoring circuit are coupled in series between the first end of the first adjustment circuit and the terminal load, and wherein the current monitoring circuit is configured to:
monitor for a decrease in amplitude of a current of the terminal load; and
send an adjustment instruction to the second adjustment circuit when the decrease in the amplitude exceeds a preset threshold,
wherein the second adjustment circuit is configured to adjust an impedance of the second adjustment circuit upward according to the adjustment instruction.

13. The charging circuit of claim 12, wherein the second adjustment circuit is further configured to restore, after a preset duration, the impedance of the second adjustment circuit to a state before the impedance of the second adjustment circuit is adjusted upward.

14. A charging circuit, comprising:
a current monitoring circuit;
an adjustment circuit coupled to the current monitoring circuit, wherein a first end of the adjustment circuit is coupled to a charger, and wherein a second end of the adjustment circuit is coupled to a first end of the current monitoring circuit;
a protection circuit coupled in series between the charger and a first end of a battery;
a current detection circuit coupled in series either:
between the protection circuit and the first end of the battery; or
between a second end of the battery and the charger; and
a voltage detection circuit, wherein a detection end of the voltage detection circuit is coupled in parallel at the first end and the second end of the battery,
wherein a second end of the current monitoring circuit is coupled to a terminal load, and wherein the current monitoring circuit is configured to:
monitor for a decrease in amplitude of a current of the terminal load; and
send an adjustment instruction to the adjustment circuit when the decrease in the amplitude exceeds a preset threshold, and
wherein the adjustment circuit is configured to adjust an impedance of the adjustment circuit upward according to the adjustment instruction.

15. The charging circuit of claim 14, wherein the adjustment circuit is further configured to restore, after a preset duration, the impedance to a state before the impedance is adjusted upward.

16. The charging circuit of claim 14, further comprising:
a control circuit coupled to the current detection circuit, the voltage detection circuit, and the protection circuit, wherein the voltage detection circuit is configured to:
  detect voltages at two ends of the battery to obtain a voltage value of the battery; and
  send the voltage value to the control circuit,
wherein the current detection circuit is configured to:
  detect a current of the charging circuit to obtain a current value of the charging circuit; and
  send the current value to the protection circuit,
wherein the control circuit is configured to:
  determine a charging mode according to the voltage value; and
  determine a protection trigger condition according to the charging mode, and
wherein the protection circuit is configured to:
  detect an output current of the charger to determine an output current value;
  determine whether the output current value or the voltage value meets the protection trigger condition; and
  open a switch to interrupt charging of the battery when the output current value or the voltage value meets the protection trigger condition.

17. A charging method, comprising:
detecting a charging current to obtain a charging current value;
detecting a voltage of a battery to obtain a voltage value of the battery;
determining a charging mode corresponding to the voltage value;
determining a current upper limit value of an adjustment circuit according to the charging mode;
decreasing the charging current by adjusting an impedance of the adjustment circuit upward according to the charging current value in response to determining that the charging current value is greater than the current upper limit value;
instructing a charger that is charging the battery to decrease an output power of the charger; and
gradually adjusting a drain-source on-state resistance of the adjustment circuit to a minimum after detecting that the output power of the charger decreases.

18. The charging method of claim 17, further comprising:
determining a current lower limit value according to the charging mode; and
increasing the charging current by adjusting the impedance of the adjustment circuit downward according to the charging current value in response to determining that the charging current value is less than the current lower limit value.

19. The charging method of claim 18, further comprising gradually increasing a drive voltage of the adjustment circuit when the charging current value is less than the current lower limit value, wherein the drive voltage is gradually increased until the drain-source on-state resistance of the adjustment circuit reaches a lower limit of a current adjustment threshold.

20. The charging method of claim 17, further comprising interrupting charging of the battery when the voltage value of the battery reaches a charging voltage cut-off threshold and the charging current reaches a charging current cut-off threshold.

* * * * *